United States Patent Office 3,061,595
Patented Oct. 30, 1962

3,061,595
POLYMERIZATION PROMOTER SYSTEM FOR
WATER-SOLUBLE POLYMERS
George H. Dorion, New Canaan, Conn., and Herbert
Burkhard, Mamaroneck, N.Y., assignors to American
Cyanamid Company, New York, N.Y., a corporation
of Maine
No Drawing. Filed Nov. 24, 1959, Ser. No. 855,010
4 Claims. (Cl. 260—80.5)

The present invention relates to the polymerization of a water solution of monomeric materials comprising essentially water, an acrylamide, an alkylidene bis-acrylamide, an amine, and a water-soluble persulfate catalyst system. In particular the present invention relates to a system of this type and the advantageous results obtained through the use of N,N,N',N'-tetramethyl ethylene diamine in the system as catalyst activator. The present system affords a means of producing extremely rapid and efficient polymerization and cross-linking of the polymer to water insolubility. The system offers excellent control of gelation times and adaptability under a relatively wide pH range and temperature conditions.

The use of water-soluble organic amines and water-soluble persulfate catalyst systems in general has at least the following advantages:

(1) Controllable rate of reaction.
(2) Ease of application due to water solubility of the system.
(3) The components are either solid or liquid so that quantities are easily measurable.

In the prior procedures for polymerization and gelation of polymers of an acrylamide monomer with methylene bisacrylamide, variations in pH and temperature have had a definite inhibitory effect on the system. In particular, when the catalyst system is composed of ammonium persulfate and a water-soluble organic amine, and the polymer is employed to provide thin surface coatings, there is a relatively large exposure to atmospheric oxygen. This exposure affects the polymer growth step and substantially hinders the efficient use of the catalyst system at moderate conditions. Consequently there has been a definite need for a catalyst system which is not substantially affected by atmospheric oxygen.

It is an object of the present invention to provide a novel and more effective polymerization system and method than those heretofore available. It is a further object of the present invention to provide a polymerization initiator system in which the inhibitory effect of changes in temperature, pH and oxygen is essentially obviated. Further objects will become apparent as the description of the invention proceeds.

The advantages offered by a water-soluble polymerizable system are known to those skilled in the art. The specific water-soluble polymerizable system herein involved is particularly attractive because it permits the use of a very inexpensive, easy penetrating aqueous based material for various applications such as on substrates or in admixture with a substantially inert material such as natural soil, sawdust, fly-ash, and the like, and the subsequent polymerization and cross-linking of the aqueous solution to water insolubility. The nature of the water-insoluble composition which is formed is in effect a hydrophilic gel which is capable of holding water in retainment but which is insoluble in and essentially impermeable to water at the saturated state of the gel.

In practicing the invention, a copolymerizable composition containing (I) an acrylamide; (II) an alkylidene bisacrylamide having the formula:

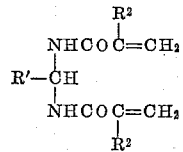

in which

is a hydrocarbon residue of an aldehyde and $R^2$ is a member of the group consisting of hydrogen and a methyl radical; (III) a water-soluble persulfate catalyst, and (IV) N,N,N',N'-tetramethyl ethylene diamine are used in producing a polymerized and cross-linked mass resistant to water permeability. This essential combination of ingredients affords a markedly improved versatile system particularly in the formation of thin films of the polymer. The order of mixing these components is not essential nor is the order in which they are mixed with the other components of the system. The persulfate catalyst is normally added last, just prior to use, so as to preclude premature gelation.

In addition to acrylamide itself, which is the preferred monomer for component (I) of the system, methacrylamide and N-methylol acrylamide may also be employed and consequently acrylamide as employed herein contemplates the inclusion also of methacrylamide and N-methylol acrylamide. In addition to an acrylamide the polymerizable system may contain as much as 80%, based on the weight of the acrylamide, of various compounds to the extent that the latter are soluble in water. Illustrative of suitable comonomeric compounds of this type are such as aluminum acrylate, acrylic acid, methacrylic acid, acrylonitrile, methacrylamide, and water-soluble salts of acrylic acid, such as sodium acrylate, potassium acrylate, and the like. In general, the concentration of the acrylamide monomer in aqueous solution may vary from about 3% to about 20% by weight, although the preferred range is from about 5 to about 15 weight percent. As component (II) any of the alkylidene bisacrylamides corresponding to the above formula which are described and claimed in Lundberg Patent No. 2,474,846 or mixtures thereof may be used as cross-linking agents in addition to the comonomer N,N'-methylene bisacrylamide set out in the examples hereinafter. Only slight solubility is required of the alkylidene bisacrylamide in view of the small amount used; therefore, this component may have a water solubility as low as about 0.02% by weight at 20° C. but a solubility of at least about 0.10% is more desirable for general purposes. Conversion of the polymerizable material to the water-insoluble condition is brought about (1) by vinyl type polymerization and covalent cross-linking with the bisacrylamide and (2) by ionic and coordinate covalent cross-linking by way of the trivalent metal acrylate. The result is a three-dimensional structure after the polymerization and subsequent gelation has been effected by a suitable catalyst. From about 1% up to about 10% by weight based on the polymerizable material of the alkylidene bisacrylamide cross-linking agent (II) may be employed although preferred results are generally derived when amounts of from about 2% to about 8% are used.

The polymerization reaction according to the invention is activated by employing a water-soluble persulfate. This is the third component of the polymerizable system. Water-soluble persulfates are well known to those skilled in the art. These include compounds such as ammonium persulfate potassium persulfate, sodium persulfate, and the like.

N,N,N',N'-tetramethyl ethylene diamine is the fourth component of the system. Although, as noted above, amines in catalyst systems have been employed heretofore, the use of N,N,N',N'-tetramethyl ethylene diamine as shown more specifically by way of examples hereinafter, provides a unique, unexpected, highly advantageous and efficient result not provided by other amines. N,N,N'N'-tetramethyl ethylene diamine offers at least the following advantages:

(1) A substantially smaller amount of N,N,N',N'-tetramethyl ethylene diamine is needed for a given polymerization reaction.

(2) The amine is applicable over a fairly wide pH range extending from about pH 5 to about pH 12.

(3) In the region of pH 5 to pH 7 where most amines lose their catalytic efficiency due to salt formation, N,N,N',N'-tetramethyl ethylene diamine retains very substantial catalytic activity.

In general, a minimum of from about 0.02 to about 5% by weight of the persulfate based on the total weight of polymerizable solution is desirable, although amounts of as little as 0.01% and up to about as much as 25% may be employed. Amounts of the N,N,N',N'-tetramethyl ethylene diamine of from about 0.01% to about 1.5% by weight of the total solution are preferred although amounts as low as 0.005 up to as high as about 2.5 may be used.

The chemical activity of the catalyst system of the invention composed of a water-soluble persulfate and the N,N,N',N'-tetramethyl ethylene diamine activator may be described as follows: The amine activator accelerates the decomposition of persulfate ($S_2O_8^=$) into sulfate radical anions ($SO_4^-$). The sulfate radical anions are the initiators of vinyl polymerization. The amine activator serves the purpose of letting the persulfate function as a catalyst at moderate temperatures. If ammonium persulfate is used without an amine activator, the temperature of the solution would have to be raised above 65° C. to facilitate the decomposition of the persulfate. Those skilled in the art will appreciate that to some extent the production of free radicals can be accelerated by increasing the catalyst and amine concentration and/or raising the temperature.

The absolute amounts of ammonium persulfate and tetramethyl ethylene diamine used to initiate polymerization will, as stated above, depend on the temperature. The preferred temperature range is from about 5° C. to about 55° C. but with a lower limit of about 0° C. (the freezing point of water) and 65° C. (the temperature at which significant self decomposition of ammonium persulfate occurs).

Copolymers of the type herein employed upon polymerization and cross-linking are equally impermeable to water, crude petroleum, and other substantially inert liquids. The gelled polymeric composition with which the invention is concerned may be employed for battery separators; sand binders for sand molds; surface stabilization of soils and sands; gel coatings on paper, for photographic films, for example, and the like.

In order that the present invention may be more fully understood, the following examples are set forth for purposes of illustration only and any specific enumeration of details should not be interpreted as a limitation, except as expressed in the appended claims.

GENERAL PROCEDURE

Various amines were tested for their efficiency as persulfate decomposers in a standard comonomer system. The comonomer system used was a 10% (by weight) aqueous solution of acrylamide and methylene biscarylamide in the weight ratio of 95:5, respectively. 100 parts of polymerizable solution per run was utilized. A standard amount of ammonium persulfate and amine was added and the time necessary to form a rigid polymer gel was noted. Since the only variable in the runs 1–12 was the particular amine used, the gel time is a direct measurement of the amine efficiencies. The results are summarized in Tables I, II and III.

Table I
RELATIVE GEL TIMES WITH EQUAL WEIGHTS OF AMINES
10% AM-9, 0.5% AP, 0.8% amine—Temperature = 26–30°

| Amine [1] | Ambient pH of System | | |
|---|---|---|---|
| | pH before AP | Absolute Gel Time (Min.) | Relative Gel Time [3] |
| TEMED | 11.2 | .18 [2] (1.4) | 1 [2] (1) |
| TMBD | 12.2 | .20 [2] (2.3) | 1 [2] (1.6) |
| DMAPN | 10.0 | .85 [2] (8.9) | 5 [2] (6) |
| TETRADEDA | 8.4 | 1.1 | 6 |
| EDT | 10.0 | 1.2 | 7 |
| TRIDEDA | 8.2 | 1.8 | 10 |
| NTP | 8.2 | 1.9 | 11 |
| AMDEDA | 8.7 | 2.9 [2] (26) | 16 (19) |
| EDAMBA | 7.7 | 3.0 | 17 |
| EDA | 10.5 | 4.0 | 22 |
| HEXI | 11.0 | 11.0 | 36 |
| PYR | 10.7 | 10.7 | 250 |

[1] Code (Applies to Tables I to III):
TEBUT = N,N,N',N'-tetramethyl-1,4-butane diamine.
TEHEX = N,N,N',N'-tetramethyl-1,6-hexane diamine.
TEMED = N,N,N',N'-tetramethyl ethylene diamine.
TMBD = N,N,N',N'-tetramethyl-1,3-butane diamine.
DMAPN = dimethylaminopropionitrile.
EDT = N,N,N',N'-tetraethylhydroxy ethylene diamine.
EDA = ethylene diamine.
NTP = nitrilotrispropionamide.
HEXI = hexamethylene tetraamine.
PYR = pyridine.
TETRADEDA = N,N,N',N-tetraacrylamido-1,4-butane diamine.
AMDEDA = N,N,N',N'-tetraacrylamido-ethylene diamine.
TRIDEDA = N,N,N',N'-tetraacrylamido propane diamine.
EDAMBA = N,N,N',N'-tetrakis (methylene bisacrylmido) ethylene diamine.
TEP = tetramethyl propane diamine.
[2] 10% AM-9, 0.1% AP, 0.2% Amine
[3] Relative gel time employs TEMED as a base of 1. All other amine gel times are based thereon to afford a convenient method of comparing efficiencies.

Table II
RELATIVE GEL TIMES WITH EQUAL WEIGHTS OF AMINES
[10% AM-9, 0.5% AP, 0.8% amine at different pH [a]]

| Amine [b] | Relative Gel Time | | |
|---|---|---|---|
| | At Ambient pH | pH = 8 | pH = 5.5 |
| TEMED | 1 | 1 | 1 |
| EDT | 7 | 13 | 8 |
| AMDEDA | 16 | 27 | 17 |
| TRIDEDA | 10 | 15 | 19 |
| EDAMBA | 17 | 39 | 26 |
| DMAPN | 5 | 7 | 40 |
| NTP | 11 | 22 | 107 |
| PYR | 250 | 610 | 300 |
| TMBD | 1 | 3 | 460 |
| TETRADEDA | 6 | 11 | 600 |
| HEXI | 36 | | 1,070 |

[a] Measured prior to addition of AP.
[b] Arranged according to their efficiency at pH 5.5.

Tables I and II illustrate that on an absolute weight basis TEMED is by far the most efficient. Table III, which follows, illustrates the advantage on a gram equivalent weight basis of the amines.

Table III
RELATIVE GEL TIMES WITH EQUAL EQUIVALENTS OF AMINES
[10% AM-9, 0.5% AP, .001 gram-equivalent weights of amines]

| Amine [a] | Relative Gel Time [b] | |
|---|---|---|
| | pH = 5.5 | pH = 8 |
| TEMED | 1 | 1 |
| EDT | 3 | 4 |
| EDA | 13 | 25 |
| NTP | 14 | 5 |
| DMAPN | 16 | 3 |
| TRIDEDA | 21 | 47 |
| EDAMBA | 22 | 24 |
| AMDEDA | 26 | 34 |
| TEP | 30 | |
| TMBD | 31 | 2 |
| TETRADEDA | 40 | 65 |
| HEXI | 60 | 93 |
| PYR | 72 | 81 |
| TEBUT | >430 | |
| TEHEX | >430 | |

[a] Listed in decreasing order of efficiency at pH = 5.5.
[b] Measured prior to addition of AP. AP addition does not measurably change pH.

EXAMPLE A

A 10% aqueous monomer solution comprising 5.8 parts of acrylamide; 0.2 part of methylene bisacrylamide; 4 parts of sodium acrylate and 3.5 parts of aluminum sulfate [$Al_2(SO_4)_3 \cdot 14H_2O$] dissolved in 86.2 parts of water is initiated with the catalyst system comprising 0.24 part ammonium persulfate and 0.3 part of N,N,N',N'-tetramethyl ethylene diamine immediately prior to coating a glass plate, kraft paper, and cotton muslin. Gelation occurs in 1/20 the time as a control in which 0.24 part of ammonium persulfate and ethylene diamine is used as the catalyst system.

EXAMPLE B

A 5.1% aqueous monomer solution comprising 2.9 parts acrylamide; 0.2 part methylene bisacrylamide; 2 parts sodium acrylate and 1.8 parts $Al_2(SO_4)_3 \cdot 14H_2O$ dissolved in 92.7 parts of water is catalyzed with 0.2 part of ammonium persulfate and 0.2 part of N,N,N',N'-tetramethyl ethylene diamine and immediately poured on New Jersey 00 sand. Gelation occurred in 40 seconds. The sand surface was stabilized as an integral mass to a depth of about one inch. In a control with hexamethylene tetramine, the solution filtered through the sand so that the upper one inch depth was substantially untreated.

EXAMPLE C

Example B is repeated in detail with the exception that methacrylamide is used in place of acrylamide. Results are comparable. Gelation occurred in 44 seconds.

We claim:

1. A method which comprises polymerizing and crosslinking an aqueous solution of polymerizable material comprising an acrylamide and containing from about 1 to 10 weight percent based on the polymerizable material of an alkylidene bisacrylamide having the formula:

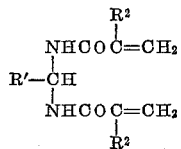

in which

is a hydrocarbon residue of an aldehyde and $R^2$ is a member of the group consisting of hydrogen and a methyl radical, in the presence of from about 0.01 weight percent to about 25.0 weight percent of a water-soluble persulfate catalyst and as activator therefor from about 0.005 weight percent to about 2.5 weight percent of N,N,N',N'-tetramethyl ethylene diamine, the weight percent of both catalyst and activator based on the total weight of the solution of polymerizable monomers.

2. A method which comprises polymerizing and crosslinking an aqueous solution of polymerizable material comprising an acrylamide and containing from about 1 to 10 weight percent based on the polymerizable material of methylene bisacrylamide, in the presence of from about 0.02 weight percent to about 5.0 weight percent of a water-soluble persulfate catalyst and as activator therefor from about 0.01 weight percent to about 1.5 weight percent of N,N,N',N'-tetramethyl ethylene diamine, the weight percent of both catalyst and activator based on the total weight of the solution of polymerizable monomers.

3. A method which comprises polymerizing and crosslinking an aqueous solution of polymerizable material comprising acrylamide and containing from about 1 to 10 weight percent based on the polymerizable material of methylene bisacrylamide, in the presence of from about 0.02 weight percent to about 5.0 weight percent of ammonium persulfate and as activator therefor from about 0.01 weight percent to about 1.5 weight percent of N,N,N',N'-tetramethyl ethylene diamine, the weight of both catalyst and activator based on the total weight of the solution of polymerizable monomers.

4. A method which comprises polymerizing and crosslinking an aqueous solution of polymerizable material comprising acrylamide and sodium acrylate in a weight ratio of 1:4 to 4:1 and containing from about 1 to 10 weight percent based on the polymerizable material of methylene bisacrylamide, in the presence of about 0.02 weight percent to about 5.0 weight percent of ammonium persulfate and as activator therefor from about 0.01 weight percent to about 1.5 weight percent N,N,N',N'-tetramethyl ethylene diamine the weight of both catalyst and activator based on the total weight of the solution of polymerizable monomers.

References Cited in the file of this patent

UNITED STATES PATENTS

| | | |
|---|---|---|
| 2,865,177 | Gnaedinger | Dec. 23, 1958 |
| 2,893,970 | Caldwell | July 7, 1959 |

UNITED STATES PATENT OFFICE
CERTIFICATE OF CORRECTION

Patent No. 3,061,595                             October 30, 1962

George H. Dorion et al.

It is hereby certified that error appears in the above numbered patent requiring correction and that the said Letters Patent should read as corrected below.

Column 2, line 68, after "persulfate", first occurrence, insert a comma; column 4, Table I, fourth column, line 8 thereof, for "16 (19)" read -- $16^2$ (19) --; line 26, for "=N,N,N',N -" read -- =N,N,N',N' - --.

Signed and sealed this 9th day of April 1963.

(SEAL)
Attest:

ESTON G. JOHNSON                                     DAVID L. LADD
Attesting Officer                                        Commissioner of Patents